United States Patent
Gruber

(10) Patent No.: US 12,459,367 B2
(45) Date of Patent: Nov. 4, 2025

(54) DRIVE SYSTEM FOR A PANTOGRAPH, AND METHOD FOR RAISING OR LOWERING

(71) Applicant: SCHUNK TRANSIT SYSTEMS GMBH, Nussdorf am Haunsberg (AT)

(72) Inventor: Alexander Gruber, Goeming (AT)

(73) Assignee: SCHUNK TRANSIT SYSTEMS GMBH, Nussdorf am Haunsberg (AT)

( * ) Notice: Subject to any disclaimer, the term of this patent is extended or adjusted under 35 U.S.C. 154(b) by 926 days.

(21) Appl. No.: 17/634,408

(22) PCT Filed: Aug. 12, 2019

(86) PCT No.: PCT/EP2019/071626
§ 371 (c)(1),
(2) Date: Sep. 7, 2022

(87) PCT Pub. No.: WO2021/028019
PCT Pub. Date: Feb. 18, 2021

(65) Prior Publication Data
US 2023/0010860 A1    Jan. 12, 2023

(51) Int. Cl.
*B60L 5/32*    (2006.01)
*B60L 5/20*    (2006.01)
(Continued)

(52) U.S. Cl.
CPC ............. *B60L 5/32* (2013.01); *B60L 5/205* (2013.01); *F16K 17/02* (2013.01); *F16K 31/126* (2013.01);
(Continued)

(58) Field of Classification Search
CPC ........ B60L 5/32; B60L 5/205; B60L 2200/26; B60Y 2200/30; F16K 17/02; F16K 31/126
See application file for complete search history.

(56) References Cited

U.S. PATENT DOCUMENTS

| 4,745,997 A | 5/1988 | Takei et al. |
| 2018/0265066 A1 | 9/2018 | Assmann et al. |

FOREIGN PATENT DOCUMENTS

| CN | 202294326 U | 7/2012 |
| CN | 206344692 U | 7/2017 |

(Continued)

OTHER PUBLICATIONS

The Federal Institute of Industrial Property, Russia, Inquiry Under the Substantive Examination, Application No. 2022103401/11(007261), Nov. 16, 2022, 12 pages.

(Continued)

*Primary Examiner* — Robert J McCarry, Jr.
(74) *Attorney, Agent, or Firm* — Quarles & Brady LLP

(57) ABSTRACT

A drive system for raising or lowering a sliding piece of a current collector for rail vehicles. The sliding piece is disposed on a positioning device of the current collector, and the sliding piece is configured to be brought into contact with an overhead line using contact pressure. The drive system includes a bellows drive which is actuated by compressed air to actuate the positioning device, and a pneumatic control unit having a control valve for supplying or withdrawing compressed air to/from the bellows drive. The drive system includes a detection line and a lowering valve for venting the bellows drive when pressure drops in the detection line, the lowering valve being a 3/2-way valve disposed in a pneumatic supply line between the control valve and the bellows drive.

15 Claims, 2 Drawing Sheets

(51) Int. Cl.
  *F16K 17/02* (2006.01)
  *F16K 31/126* (2006.01)
(52) U.S. Cl.
  CPC ....... *B60L 2200/26* (2013.01); *B60Y 2200/30* (2013.01)

(56) References Cited

FOREIGN PATENT DOCUMENTS

| | | | |
|---|---|---|---|
| CN | 208149090 | U | 11/2018 |
| DE | 69329314 | T2 | 4/2001 |
| DE | 10126042 | A1 | 1/2002 |
| DE | 10324790 | A1 | 12/2004 |
| EP | 0311048 | A1 | 4/1989 |
| EP | 311048 | B1 * | 3/1993 ................ B60L 5/28 |
| EP | 0395504 | B1 | 7/1994 |
| EP | 0449704 | B1 | 6/1996 |
| EP | 1862347 | A1 | 12/2007 |
| JP | 85546805 | A | 4/1980 |
| JP | 2007189754 | A | 7/2007 |
| RU | 181007 | U1 | 7/2018 |

OTHER PUBLICATIONS

PCT International Search Report and Written Opinion, PCT/EP2019/071626, Apr. 17, 2020, 20 pages.
ACTGV, Le Pantographe CX, https://web.archive.org/web/20130513005710/https://actgv.fr/wpcontent/uploads/2012/05/Le-PANTOGRAPHE-CX.pdf, May 13, 2013, [Includes English Language Translation], 14 pages.
ACTGV, TGV Duplex, https://web.archive.org/web/20130515184403/https://actgv.fr/wpcontent/uploads/2012/05/TGV-duplex-23-02-2012.pdf#expand, May 15, 2013, [Includes English Language Translation], 12 pages.
Afnor Group, Norme Europeene, EN 50206-1, Applications Ferroviaires—Materiel Roulant—Pantographes: Caracteristiques et essais—Partie 1: Pantographes Pour Vehicules Grandes Lignes, Mar. 2011, [Includes English Language Translation], 66 pages.

* cited by examiner

Fig. 1 State of the Art

DRIVE SYSTEM FOR A PANTOGRAPH, AND METHOD FOR RAISING OR LOWERING

This application represents the national stage entry of PCT International Application No. PCT/EP2019/071626 filed on Aug. 12, 2019, which application is hereby incorporated by reference in its entirety for all purposes.

The disclosure relates to a drive system and a method for raising or lowering at least one sliding piece of a current collector for rail vehicles, the sliding piece being disposed on a positioning device of the current collector, said positioning device being adjustable by the drive system, and the sliding piece being configured to be brought into contact with an overhead line using a contact pressure, the drive system comprising a bellows drive which is configured to be actuated by means of compressed air for actuating the positioning device, the drive system comprising a pneumatic control unit having a control valve for supplying or withdrawing compressed air to/from the bellows drive, and the drive system comprising a lowering unit having a pneumatic detection line and a lowering valve for venting the bellows drive when pressure drops in the detection line.

Sliding pieces made of graphite are typically used for transmitting energy from an overhead wire to a vehicle, such as a locomotive. When the sliding piece is subject to heavy wear or damage, the overhead wire or an overhead line can be damaged, for example. Therefore, locomotives are typically equipped with a sensor technology which effects a lowering of the sliding strip by means of the sliding piece or a positioning device supporting the sliding piece, such as a so-called pantograph or the like, when a specific intended wear limit is exceeded or the sliding piece is damaged. The sensor technology comprises a sensor element which can be formed or disposed in the sliding piece as a fluid-tight channel or as a tubular profile, for example. The sensor element thus forms a detection line which is subjected to compressed air. When a wear limit has been reached or the sliding piece is damaged, the detection line is abraded and compressed air escapes. The pressure drop in the detection line can be detected, causing the positioning device to lower the sliding piece.

In order to prevent damages, it is essential that the sliding piece is lowered from the overhead line as quickly as possible, for which reason this is carried out by means of a lowering unit specially realized for this purpose. In contrast to the control unit, by means of which a regular raising and lowering of the sliding piece is controlled or effected, the lowering unit is intended to effect a comparatively quick lowering of the sliding piece when a pressure drop is detected. Thus, the lowering unit typically has a lowering valve which is connected to the detection line and which is a differential pressure valve. The differential pressure valve is directly connected to a bellows drive for raising or lowering the sliding strip by means of the positioning device, such that the bellows drive can be vented quickly. In principle, venting can also be effected by means of the control unit, however, it does not allow a quick venting because of the long conduction paths and the valves contained in a pneumatic circuit of the control unit. When a pressure drop is detected by the differential pressure valve, a supply line of the bellows drive is opened by the differential pressure valve in such a manner that the compressed air contained in the bellows drive can escape from the supply line unhindered.

The differential pressure valve can be a 2/2-way valve which can be realized as a diaphragm valve, or example. After a repair or a replacement of the detection line or the sliding piece, raising the sliding piece can be effected only after the differential pressure valve has been restored or the damage which caused a pressure drop has been repaired, because otherwise compressed air would escape from the supply line. Experience has shown that a general function of the differential pressure valve, such as restoring the differential pressure valve at very high or low temperatures, is not reliably guaranteed.

Therefore, the object of the present disclosure is to propose a drive system and a method for raising or lowering a sliding piece of a current collector which allow the drive system to operate reliably.

This object is attained by a drive system having the features of claim 1, a current collector having the features of claim 13 and a method having the features of claim 14.

By means of the drive system according to the disclosure for raising or lowering at least one sliding piece of a current collector for rail vehicles, the sliding piece can be disposed on a positioning device of the current collector, said positioning device being adjustable by the drive system, and the sliding piece can be brought into contact with an overhead line using a contact pressure, the drive system comprising a bellows drive which is configured to be actuated by means of compressed air for actuating the positioning device, the drive system comprising a pneumatic control unit having a control valve for supplying or withdrawing compressed air to/from the bellows drive, and the drive system comprising a lowering unit having a pneumatic detection line and a lowering valve for venting the bellows drive when pressure drops in the detection line, the lowering valve being a 3/2-way valve, the lowering valve being disposed in a pneumatic supply line between the control valve and the bellows drive.

Thus, the drive system according to the disclosure is realized such that by means of the control unit or its control valve, compressed air can be supplied to or withdrawn from the bellows drive for raising or lowering the sliding piece via the positioning device. Additionally, the drive system has the lowering unit which comprises the detection line and by means of which a pressure drop in the detection line can be detected. In this case, the lowering valve is realized as a 3/2-way valve and disposed in the supply line of the bellows drive between the control valve and the bellows drive. This position of the 3/2-way valve allows a quick venting of the bellows drive even before the control valve. In particular by realizing the lowering valve as a 3/2-way valve it becomes possible to dispose it directly in the supply line of the bellows drive. By means of the 3/2-way valve, the supply line from the control valve to the bellows drive can be switched to a first switching position so that compressed air can pass through and, in a second switching position, said supply line can be separated from the control valve, such that compressed air can directly escape from the bellows drive to an environment via the 3/2-way valve bellows drive.

In particular, it can be intended that in a restored switching position, the 3/2-way valve generally allows compressed air to escape from the bellows drive. Furthermore, the 3/2-way valve can be actuated by means of compressed air in the detection line, for example. In this manner, it is always ensured that when a loss of compressed air occurs in the detection line, the 3/2-way valve is switched to the switching position, where compressed air escapes from the bellows drive. Since a 3/2-way valve is more reliable in comparison for the intended application at hand than a 2/2-way valve or a differential pressure valve, raising the sliding piece after a repair or an exchange of the detection line can also be effected reliably without an unintended blocking of the lowering valve.

It is especially advantageous if the lowering valve is a 3/2-way valve with spring return. With the spring return, the lowering valve can be moved to a switching position in which the bellows drive is quickly vented. This ensures in any case that when pressure drops in the detection line, the sliding piece is lowered. The lowering valve can be configured to be pneumatically actuated via the detection line in such a manner that when there is an operating pressure in the detection line, the lowering valve opens the supply line and when pressure drops in the detection line, the lowering valve closes the supply line towards the control valve and vents the bellows drive. Pneumatically actuating the lowering valve or the 3/2-way valve can be effected by an operating pressure in the detection line. If pressure drops relative to the operating pressure in the detection line, the lowering valve can be restored to the switching position which vents the bellows drive.

The detection line can be connected to a second pneumatic supply line of the control unit for forming the operating pressure in the detection line, a throttle valve of the lowering unit being disposed in the second supply line. Via the second supply line, the detection line can be filled with compressed air until an operating pressure in the detection line is reached. Since the throttle valve is disposed in the second supply line, the operating pressure is offset at a delay after a pressure has dropped in the detection line. This means that when pressure drops in the detection line, a switching of the lowering valve occurs because the pressure drop in the detection line cannot be compensated quickly enough via the second supply line. Otherwise, the pressure drop would possibly be offset via the second supply line, which would prevent the lowering valve from operating in an unintended manner.

The second supply line can be connected between the control valve and a compressed air source or between the control valve and a pressure regulator for forming an operating pressure. In this manner, it can be ensured that the second supply line can be subjected to compressed air irrespective of the control valve and is not affected by a switching position of the control valve.

The lowering unit can be connected to the control unit via a pneumatic signaling line, the signaling line being connectable to a pressure switch of the control unit and to the detection line. Via the signaling line, a pressure drop in the detection line at the pressure switch in the control unit can be transmitted pneumatically. Via the pressure switch, the lowering of the sliding piece can be signaled to a driver of a rail vehicle, for example, in the manner of an alarm or status notification. Furthermore, a lowering of additional sliding pieces on additional current collectors of the rail vehicle can be actuated via the pressure switch. Thus, damage to these sliding pieces can possibly be prevented.

The control unit can have an additional pressure switch, which is connected to the supply line between the control valve and the bellows drive. Via the additional pressure switch, it can be signaled to a driver of a rail vehicle, for example, that the supply line is pressurized and thus, the sliding piece is raised.

The control unit can be connectable to a compressed air source and have a pressure regulator for forming an operating pressure. The compressed air source can be formed by the rail vehicle itself. With the pressure regulator, a consistently constant operating pressure can be formed. Furthermore, the control unit can also have a feature for purifying the compressed air and an overpressure valve for limiting the pressure.

The control valve can be a 5/2-way valve, the control valve being configured to be actuated electromagnetically. With the electromagnetic actuation, a driver of a rail vehicle, for example, can easily initiate a raising or lowering by operating a switch. The 5/2-way valve can be configured such that for raising the sliding piece, the supply line can be connected directly to a compressed air source in a first switching position. In a second switching position, the compressed air source can be separated or closed off from the supply line via the 5/2-way valve. For venting the bellows drive or for lowering the sliding piece slowly, the supply line can be passed through the 5/2-way valve into an environment. Furthermore, the 5/2-way valve can be formed so as to have a spring return in such a manner that in a spring-returned switching position, the supply line is vented.

The control unit can have at least one throttle check valve in the supply line, the throttle check valve being configured to be connected between the control valve and the bellows drive, compressed air which is supplied to the bellows drive via the supply line by means of the throttle check valve being able to be throttled and compressed air which is withdrawn from the bellows drive being able to be conducted or vice versa. With the throttle check valve, a raising or lowering of the sliding piece can be set as intended regarding a raising or lowering speed. The throttle check valve can be disposed such in the supply line that either the raising or the lowering is decelerated. Nevertheless, two throttle check valves can be disposed in the supply line in a series circuit in such a manner that the raising and the lowering are each decelerated by one of the throttle check valves.

The control unit can have an additional throttle valve, compressed air which is supplied to the bellows drive via the supply line by means of the additional throttle valve or compressed air which is withdrawn from the bellows drive being able to be throttled. For example, if only one throttle check valve is provided in the supply line, the additional throttle valve can be disposed such that when the supply line is vented via the control valve, the venting is decelerated by means of the additional throttle valve, such that the sliding piece is lowered slowly. For this purpose, the additional throttle valve can be formed having a sound absorber.

The control unit, the lowering unit and the bellows drive can be disposed so as to be spatially separated from one another. The lowering valve or the lowering unit can advantageously be disposed nearby the bellows drive, such that a quick venting of the bellows drive and a short connection to the detection line is possible. To protect the control unit against detrimental environmental impacts, it can be disposed within the rail vehicle or in a separate housing on the rail vehicle and can be connected to the bellows drive or the lowering unit via corresponding compressed air lines.

The current collector according to the disclosure has a positioning device and at least one sliding piece which is disposed on the positioning device and a pneumatic drive system according to the disclosure. Further advantageous embodiments of a current collect are apparent from the description of features of the dependent claims referring back to claim 1.

In the method according to the disclosure for raising or lowering at least one sliding piece of a current collector for rail vehicles with a drive system, the sliding piece is disposed on a positioning device of the current collector, said positioning device being adjustable by the drive system, and the sliding piece is brought into contact with an overhead line using a contact pressure, a bellows drive of the drive system actuating the positioning device by means of compressed air, compressed air being supplied to or withdrawn from the bellows drive by means of a control valve of a pneumatic control unit of the drive system, and a pneumatic detection line and a lowering valve of a lowering unit of the drive system venting the bellows drive when pressure drops in the detection line, a 3/2-way valve with spring return being used as a lowering valve, the lowering valve being disposed in a pneumatic supply line between the control valve and the bellows drive. For further details on the method according to the disclosure, reference is made to the description of advantages of the drive system according to the disclosure.

When pressure drops in the detection line relative to an operating pressure formed by a pressure regulator of the control unit, the lowering valve can be switched in such a manner that the bellows drive is vented directly via the lowering valve and the sliding piece is lowered.

When the detection line is sealed tightly, said detection line can be filled with compressed air until an operating pressure formed by a pressure regulator of the control unit is reached, the lowering valve being switchable in such a manner when the operating pressure in the detection line is reached that the bellows drive is directly driven by compressed air via the supply line and the sliding piece can be raised.

Further advantageous embodiments of the method are apparent from the description of features of the dependent claims referring back to claim 1.

Hereinafter, the disclosure will be described in more detail with reference to the accompanying drawing.

Figure 1:
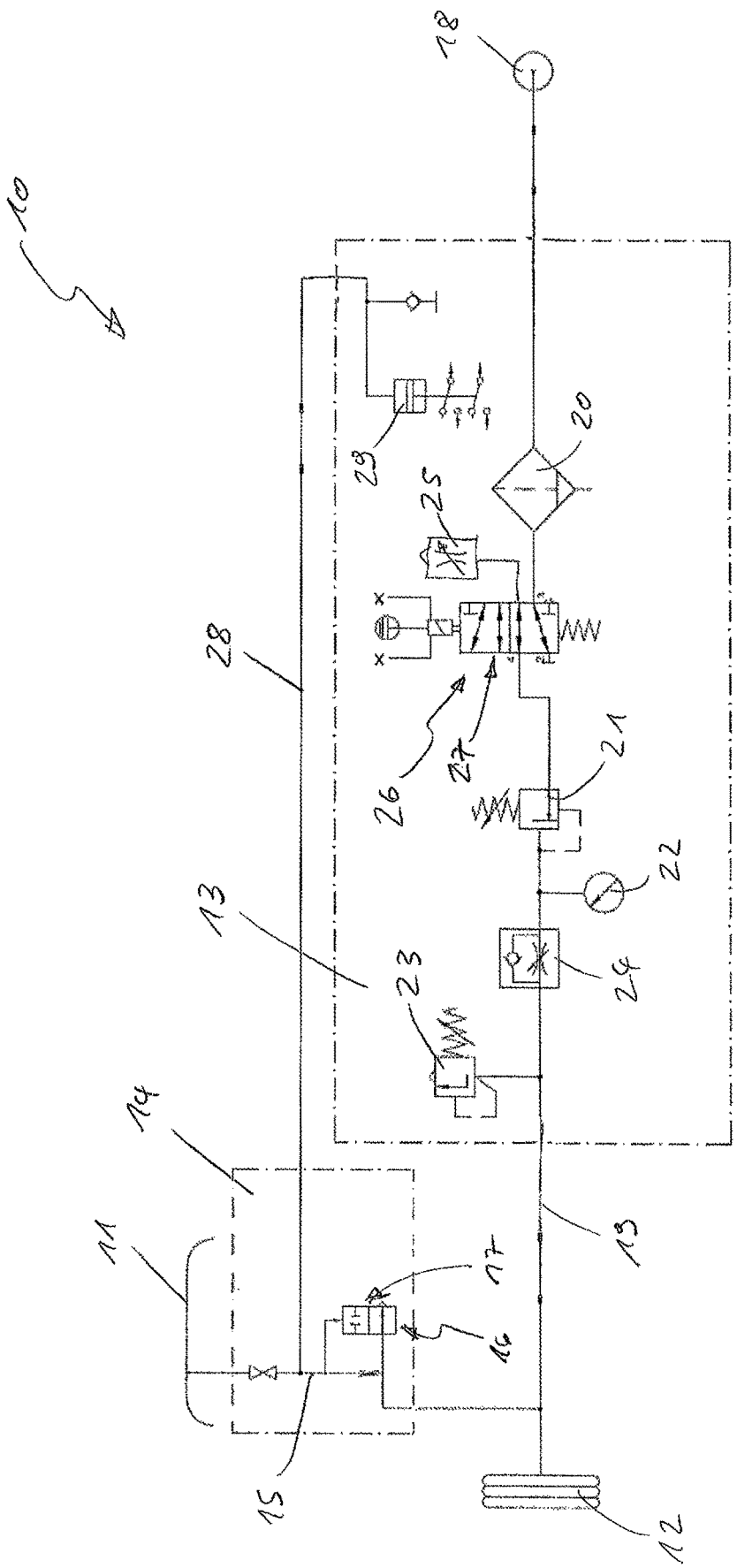
FIG. 1 shows a circuit diagram of a drive system according to the state of the art.

FIG. 1 shows a circuit diagram of a drive system according to the state of the art for raising or lowering a sliding piece 11 of a current collector (not shown here) for rail vehicles according to the state of the art. Sliding piece 11 is disposed on a positioning device (also not shown here) of the current collector, said positioning device being adjustable by the drive system. The positioning device can be a so-called pantograph or another lever arm system, for example. Furthermore, drive system 10 comprises a bellows drive 12 for actuating the positioning device. By filling bellows drive 12 with compressed air, sliding piece 11 is brought into contact with an overhead line (not shown here) via the positioning device, sliding piece 11 being lowered again when bellows drive 12 is vented.

Furthermore, drive system 10 comprises a control unit 13 and a lowering unit 14. Lowering unit 14 is formed by a pneumatic detection line 15 and a lowering valve 16, which is formed by a differential pressure valve 17 or a 2/2-way valve in this case. Control unit 13 is connected to a compressed air source 18 and connected to bellows drive 12 via a supply line 19. Control unit 13 comprises a compressed air purifier 20, a pressure regulator 21 for forming an operating pressure, a manometer 22 for displaying an operating pressure, an overpressure valve 23 for limiting an operating pressure, a throttle check valve 24, another throttle valve 25 and a control valve 26. Control valve 26 is a 5/2-way valve 27 with electromagnetic drive and spring return.

In the switching position of control valve 26 illustrated in FIG. 1, bellows drive 12 is being vented. The venting is effected via additional throttle valve 25, causing a slow lowering of sliding piece 11. When sliding piece 11 is raised, control valve 26 is in its second switching position, in which the introduction of compressed air to bellows drive 12 via throttle check valve 24 is also decelerated.

When filling bellows drive 12 via supply line 19, detection line 15 is also pressurized and differential pressure valve 17 switches from the shown switching position for quick venting to the second switching position of differential pressure valve 17, supply line 19 being tightly sealed at differential pressure valve 17 against an environment in said second switching position. When pressure drops in detection line 15, a quick venting of the supply line or bellows drive 12 is effected by differential pressure valve 17 because of the pressure difference between supply line 19 and detection line 15.

Furthermore, the lowering unit is connected to control unit 13 via a signaling line 28, which is directly connected to detection line 15. Signaling line 28 acts on a pressure switch 29 of control unit 13, by means of which a parallel lowering of other current collectors which are disposed on the rail vehicle can be initiated.

Figure 2:
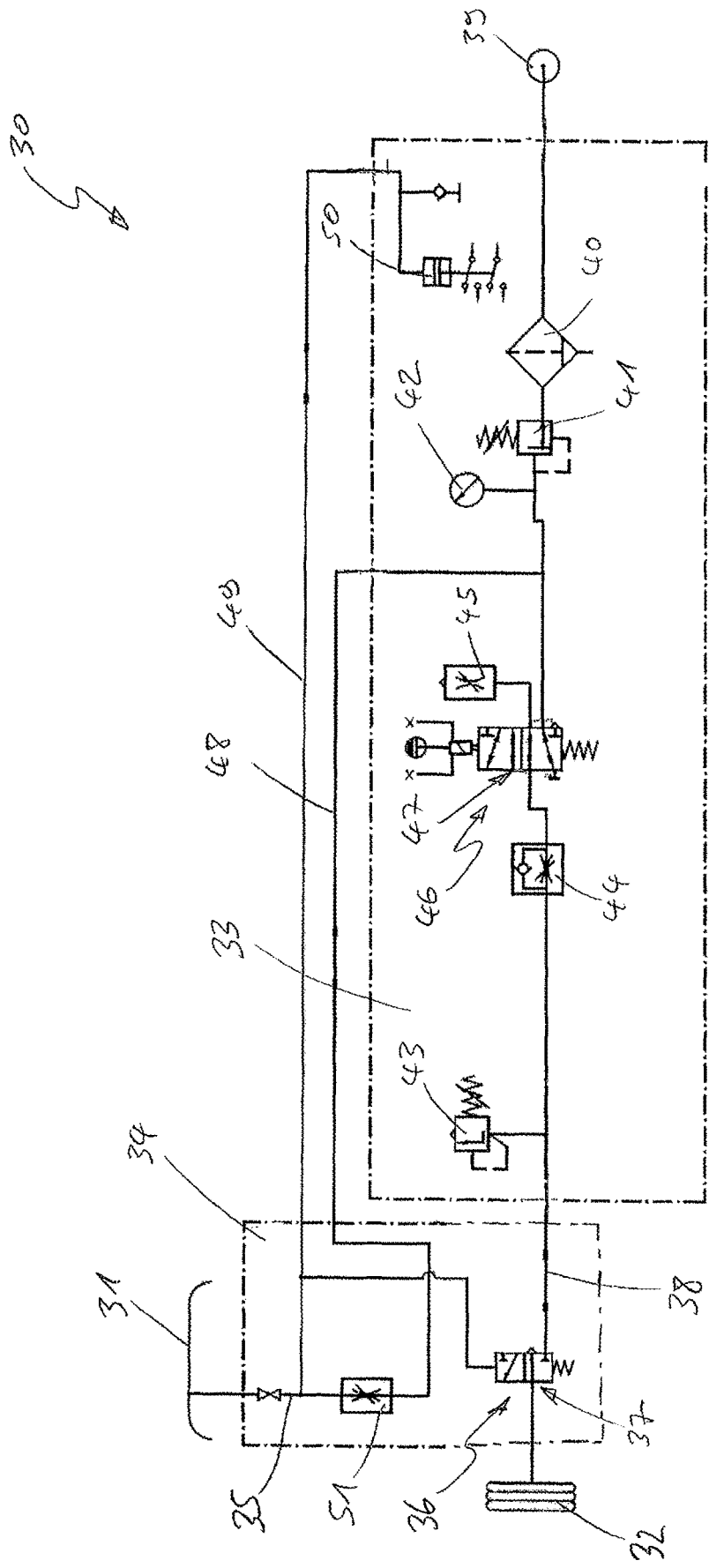
FIG. 2 shows a circuit diagram of a drive system.

FIG. 2 shows a drive system 30 for raising or lowering a sliding piece 31 of a current collector (not shown here) of a rail vehicles via a positioning device (also not shown here). Drive system 30 comprises a bellows drive 32 for actuating the positioning device and a control unit 33 and a lowering unit 34 for venting bellows drive 32 and for quickly lowering sliding piece 31. Lowering unit 34 comprises a detection line 35 and a lowering valve 36 for venting bellows drive 32, which is a 3/2-way valve 37 and which is disposed in a supply line 38 of bellows drive 32 in this case.

Control unit 33 is connected to a compressed air source 39 and has supply line 38. Control unit 33 also comprises a compressed air purifier 40, a pressure regulator 41, a manometer 42, an overpressure valve 43, a throttle check valve 44 and another throttle valve 45. Furthermore, control unit 33 comprises a control valve 46, which, in this case, is a 5/2-way valve which can be actuated electromagnetically and has a spring return. A function of control unit 33 largely corresponds to a function of the control unit described in FIG. 1. Here, in contrast, detection line 35 is connected to a second supply line 48 of control unit 33, via which an operating pressure is formed in detection line 35. Second supply line 48 is thus connected to supply line 38 downstream of pressure regulator 41 and upstream of control valve 46. Additionally, a signaling line 49 having a pressure switch 50 of control unit 33 is connected to detection line 35.

In addition to lowering valve 36, lowering unit 34 has a throttle valve 51 in second supply line 48. Filling or increasing the pressure in signaling line 49 and detection line 35 is effected in a decelerated manner via second supply line 48 and throttle valve 51. In this case, throttle valve 51 can alternatively be a gate or bottleneck in second supply line 48. When pressure drops in detection line 35, this pressure drop cannot be offset immediately via second supply line 48. Detection line 35 is connected to 3/2-way valve 37 and allows an actuation of 3/2-way valve 37.

In the illustrated switching position, bellows drive 32 is vented via 3/2-way valve 37. This switching position is reached by a spring return of 3/2-way valve 37, when a pressure has dropped in detection line 35. When an operating pressure is reached in detection line 35, 3/2-way valve 37 is switched to the second switching position, in which supply line 38 is switched so as to be interconnected or uninterrupted. Then, it is possible to raise or lower sliding piece 31 unhindered by means of bellows drive 32.

The invention claimed is:

1. A drive system for raising or lowering at least one sliding piece of a current collector for rail vehicles, the sliding piece being disposed on a positioning device of the current collector, said positioning device being adjustable by the drive system, and the sliding piece being configured to be brought into contact with an overhead line using a contact pressure, the drive system comprising a bellows drive which is configured to be actuated by means of compressed air for actuating the positioning device, the drive system comprising a pneumatic control unit having a control valve for supplying or withdrawing compressed air to/from the bellows drive, and the drive system comprising a lowering unit having a pneumatic detection line and a lowering valve for venting the bellows drive when pressure drops in the detection line,
wherein
the lowering valve is a 3/2-way valve, the lowering valve being disposed in a pneumatic supply line between the control valve and the bellows drive, and wherein the detection line is connected to a second pneumatic supply line of the control unit for forming the operating pressure in the detection line, a throttle valve of the lowering unit being disposed in the second supply line.

2. The drive system according to claim 1, wherein the lowering valve is a 3/2-way valve with spring return.

3. The drive system according to claim 1, wherein the lowering valve is configured to be pneumatically actuated via the detection line in such a manner that when there is an operating pressure in the detection line, the lowering valve opens the supply line and when pressure drops in the detection line, the lowering valve closes the supply line towards the control valve and vents the bellows drive.

4. The drive system according to claim 1, wherein the second supply line is connected between the control valve and a compressed air source or between the control valve and a pressure regulator for forming an operating pressure.

5. The drive system according to claim 1, wherein the lowering unit is connected to the control unit via a pneumatic signaling line, the signaling line being connected to a pressure switch of the control unit and the detection line.

6. The drive system according to claim 1, wherein the control unit has an additional pressure switch which is connected to the supply line between the control valve and the bellows drive.

7. The drive system according to claim 1, wherein the control unit is connectable to a compressed air source and has a pressure regulator for forming an operating pressure.

8. The drive system according to claim 1, wherein the control valve is a 5/2-way valve, the control valve being configured to be actuated electromagnetically.

9. The drive system according to claim 1, wherein the control unit has at least one throttle check valve in the supply line the throttle check valve being connected between the control valve and the bellows drive, compressed air which is supplied to the bellows drive via the supply line by means of the throttle check valve being able to be throttled and compressed air which is withdrawn from the bellows drive being able to be conducted or vice versa.

10. The drive system according to claim 9, wherein the control unit has an additional throttle valve, compressed air which is supplied to the bellows drive via the supply line by means of the additional throttle valve or compressed air which is withdrawn from the bellows drive being able to be throttled.

11. The drive system according to claim 1, wherein the control unit, the lowering unit and the bellows drive are disposed so as to be spatially separated from one another.

12. A current collector having a positioning device, at least one sliding piece disposed on the positioning device and a pneumatic drive system according to claim 1.

13. A method for raising or lowering at least one sliding piece of a current collector for rail vehicles with a drive system, the sliding piece being disposed on a positioning device of the current collector, said positioning device being adjustable by the drive system, and the sliding piece being brought into contact with an overhead line using a contact pressure, a bellows drive of the drive system actuating the positioning device by means of compressed air, compressed air being supplied to or withdrawn from the bellows drive by means of a control valve of a pneumatic control unit of the drive system, and a pneumatic detection line and a lowering valve of a lowering unit of the drive system venting the bellows drive when pressure drops in the detection line,
wherein
a 3/2-way valve with spring return is used as a lowering valve, the lowering valve being disposed in a pneumatic supply line between the control valve and the bellows drive, and wherein the detection line is connected to a second pneumatic supply line of the control unit for forming the operating pressure in the detection line, a throttle valve of the lowering unit being disposed in the second supply line.

14. The method according to claim 13, wherein when pressure drops in the detection line relative to an operating pressure formed by a pressure regulator of the control unit, the lowering valve is switched in such a manner that the bellows drive is vented directly via the lowering valve and the sliding piece is lowered.

15. The method according to claim 13, wherein when the detection line is sealed tightly, said detection line is filled with compressed air until an operating pressure formed by a pressure regulator of the control unit is reached, the lowering valve being switched in such a manner when the operating pressure is reached in the detector line that the bellows drive is directly driven by compressed air via the supply line and the sliding piece is raised.

* * * * *